(12) United States Patent
Gisolfi et al.

(10) Patent No.: US 10,430,619 B2
(45) Date of Patent: Oct. 1, 2019

(54) MANAGEMENT OF DIGITAL COPIES OF REGISTRATIONS USING MOBILE DEVICES

(71) Applicant: International Business Machines Corporation, Armonk, NY (US)

(72) Inventors: Daniel A. Gisolfi, Hopewell, NY (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 14/278,552

(22) Filed: May 15, 2014

(65) Prior Publication Data

US 2015/0332023 A1 Nov. 19, 2015

(51) Int. Cl.
| | |
|---|---|
| *G06F 21/88* | (2013.01) |
| *G06F 21/10* | (2013.01) |
| *H04L 29/06* | (2006.01) |
| *G06F 21/33* | (2013.01) |
| *G06F 21/60* | (2013.01) |
| *G06F 21/62* | (2013.01) |
| *G06F 21/64* | (2013.01) |
| *G06Q 20/00* | (2012.01) |

(52) U.S. Cl.
CPC .............. *G06F 21/88* (2013.01); *G06F 21/10* (2013.01); *G06F 21/33* (2013.01); *G06F 21/606* (2013.01); *G06F 21/6209* (2013.01); *G06F 21/64* (2013.01); *G06Q 20/00* (2013.01); *H04L 63/0823* (2013.01); *H04L 63/12* (2013.01); *H04L 63/123* (2013.01)

(58) Field of Classification Search
CPC ................................ G06F 21/10; H04L 63/12
See application file for complete search history.

(56) References Cited

U.S. PATENT DOCUMENTS

| | | | |
|---|---|---|---|
| 7,073,063 B2 | 7/2006 | Peinado | |
| 8,215,546 B2 | 7/2012 | Lin | |
| 2004/0024688 A1* | 2/2004 | Bi | ............................ G06F 21/10 705/37 |
| 2005/0065799 A1* | 3/2005 | Dare | ................... G06F 21/6245 705/50 |
| 2009/0106110 A1 | 4/2009 | Stannard et al. | |

(Continued)

FOREIGN PATENT DOCUMENTS

WO    2013072374 A1    5/2013

OTHER PUBLICATIONS

Coogan, G., "May I see your smartphone and registration please?", http://mobilepaymentstoday.com/blogs/8769/May-I-see-your-smart . . . , Aug. 28, 2012 (last accessed Apr. 25, 2014 3:50 PM).

(Continued)

*Primary Examiner* — Farid Homayounmehr
*Assistant Examiner* — Suman Debnath
(74) *Attorney, Agent, or Firm* — Scully, Scott, Murphy & Presser, P.C.; Jay Wahlquist, Esq.

(57) ABSTRACT

A master digital copy of a registration is transmitted. The registration is proof that a physical object has been registered with a registration authority. A valid peripheral digital copy of the registration is received. The valid peripheral digital copy of the registration was made from the master digital copy of the registration and is incapable of being used to make other valid digital copies of the registration.

20 Claims, 6 Drawing Sheets

(56) References Cited

U.S. PATENT DOCUMENTS

2014/0282900 A1* 9/2014 Wang .................. H04L 63/04
   726/4
2015/0215492 A1* 7/2015 De Vuono ......... H04N 1/32144
   382/100

OTHER PUBLICATIONS

Toups, D., "License, registration and smartphone," http://www.carinsurance.com/Articles/states-smartphone-proof-of-insura . . . (last updated Mar. 31, 2014; last accessed Apr. 25, 2014 3:52 PM).
IBM, "Mobile Identity: A cryptographic framework for issuing, managing, and challenging digital identification documents," http://www-01.ibm.com/software/ebusiness/jstart/dowloads/mi6x20.pdf.

* cited by examiner

MANAGEMENT OF DIGITAL COPIES OF REGISTRATIONS USING MOBILE DEVICES

BACKGROUND

The present disclosure relates to registrations associated with physical objects, and more specifically, to managing digital copies of these registrations.

In many contexts, systems for the voluntary or compulsory registering of physical objects may be helpful in promoting group organization, responsible ownership, revenue generation, and theft deterrence. An entity (e.g., a government, an organization, or a business) can use one or more of many different types of registration systems. Despite their differences, these registration systems may share common characteristics. Specifically, each system can have one or more registration authorities that are responsible for managing the issuance of registrations for given physical objects of a certain class or classes provided that the requirements for registration are met by a registrant (e.g., an owner of a physical object). Given the widespread use of certain registration systems, it is important that these systems continue to evolve and embrace new technologies in the face of the ever-changing security challenges that are part of our modern society.

SUMMARY

According to embodiments of the present disclosure, aspects of the disclosure include a method, a system, and a computer program product for managing digital copies of a registration. The method, system, and computer program product include transmitting a master digital copy of the registration. The registration acts as proof that a physical object has been registered with a registration authority. The method, system, and computer program product include receiving a valid peripheral digital copy of the registration. The valid peripheral digital copy of the registration was made from the master digital copy of the registration and is incapable of being used to make other valid digital copies of the registration.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
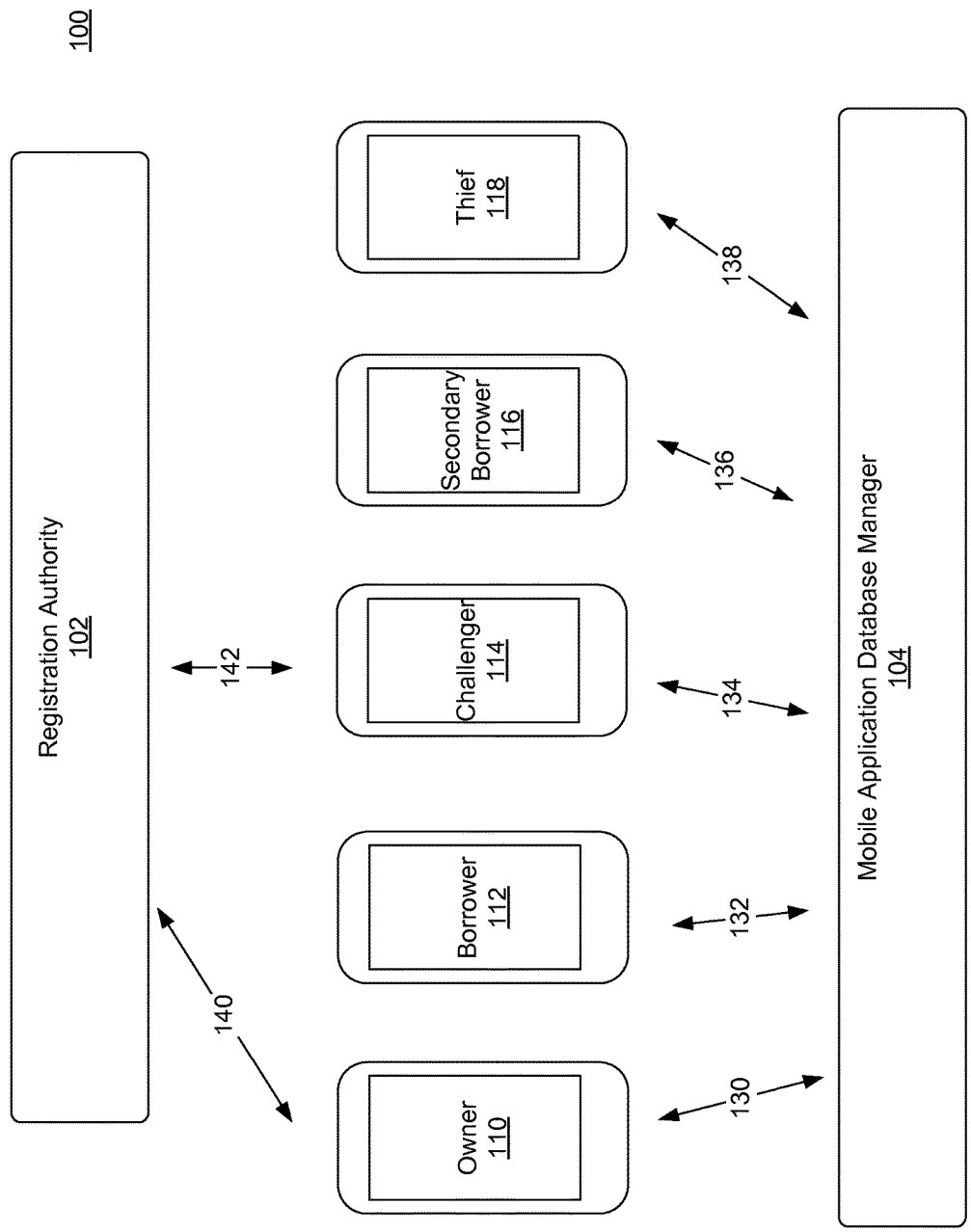
FIG. 1 is a diagrammatic illustration showing various interactions that may occur between mobile devices and other computer systems, in accordance with embodiments of a registration system of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing digital copies of registrations. While the present disclosure is not necessarily limited to such applications, various aspects of the disclosure may be appreciated through a discussion of various examples using this context.

As used herein, a physical object may refer to tangible movable objects. For example, physical objects include vehicles (watercraft, automobiles, trailers, etc.) and animals (pets, wild animals, livestock, etc.). A physical object may further refer to a real property object; for example, land and physical structures attached to land (houses, barns, hotel rooms, etc.).

As used herein, a registration authority refers to the entity that controls or requires a registration system (e.g., a state government, an apartment complex owner, etc.) or agents or subagents that manage the registration process on that entity's behalf (e.g., a department of motor vehicles). Further, as used herein, a registration refers to a document (i.e., electronic or printed matter containing information) that is created upon the registering of a physical object with a registration authority by a registrant (e.g., an owner), which may act as proof that the physical object has been registered.

In some embodiments of the present invention, a registration authority may allow, encourage, or require a registrant to provide a copy of a registration to any other individual he allows to use the physical object that is the subject of the registration. For example, in some embodiments, a copy of the registration is required to be with the user of a physical object whenever he uses the object and may be associated with certain rights of the object's registrant. When this type of registration sharing occurs, certain difficulties with authentication of copies of registrations can arise; that is to say, registrations can become more difficult for a registration authority to track or verify when they are allowed to be shared among users of a registered object. For illustrative purposes, consider that a driver's license (which is typically not a registration) will typically have a single lawful user and include an image of that user. This makes the license easier for a given challenger to verify as being authentic and belonging to the license user than, say, a vehicle registration, which typically can be lawfully used by anyone who is lawfully entitled to use a particular vehicle, and which typically is not associated with an image of the vehicle user.

Using some embodiments of the present invention, a registration authority may be able to better overcome these challenges and increase the security surrounding a registration system by limiting the issuance copies of registrations or limiting the rights associated with certain copies of registrations. In some embodiments, such efforts take the form of limiting the issuance or distribution of master digital copies of registrations. As used herein, a master digital copy of a registration refers to a valid digital copy of a registration that can be used to make other valid digital copies of the registration. In some embodiments, a registration authority will only issue digital copies of registrations that are master digital copies or will issue master digital copies of registrations only under certain conditions. For example, in some embodiments, master digital copies of registrations can only be issued by a registration authority to registrants. Further, in some embodiments, a particular master digital copy of a registration is associated with only a single device (e.g., a mobile device of a registrant) and certain rights associated with that particular master digital copy of the registration are not transferable, or that particular master digital copy itself is not transferable (i.e., movable between devices). Further, in some embodiments, a master digital copy of a registration can only be used to create (i.e., copied to create) other valid copies of registrations when those copies of the master digital copy are themselves incapable of being used to create other valid copies. This may occur, for example, where the registration authority wants to limit or prevent secondary copying (i.e., secondary borrowing) of registrations. Further, in some embodiments, master digital copies of registrations are digitally signed.

It is contemplated that within a given registration system of the present invention, a registration authority can issue copies of one or more registrations (e.g., master digital copies) for hundreds or thousands of physical objects of the same type or class (e.g., vehicles, animals, etc.). In some embodiments, the validity of each of these copies of the registration is revocable or the copies of the registration are subject to expiration. In some embodiments, the sale or transfer of a registered physical object will serve to invalidate a copy of a registration and require that a new registration be obtained. In some embodiments, a registration authority will have a set of policies detailing which physical objects may or must be registered (or re-registered) and which interested individuals or entities are responsible for making sure that these physical objects are registered with the registration authority.

Numerous individuals or entities may be associated with roles within the context of an embodiment of a registration system of the present invention. In some embodiments, applicable roles include owners, borrowers, challengers, secondary borrowers, and thieves.

Consistent with embodiments, an owner is any entity or individual that has significant use or access rights associated with a particular physical object that is subject to being registered with a registration authority and has the right control the ability of others to use or access that physical object. Examples of owners include the purchaser of a wild animal, the lessee of automobile, and the renter of an apartment or hotel room.

In some embodiments, another role is a borrower. In this context, a borrower is an entity or individual that obtains temporary use or access rights in a physical object from an owner. The owner may or may not receive payment for granting the temporary rights. One example of a borrower includes an individual who is loaned a car for a week by the car owner. In another example, a borrower would be a brother who is given permission to a stay at an apartment overnight by the apartment lessee, his sister.

In some embodiments, a third role is associated with a challenger. A challenger refers to an individual or entity that is entrusted by another individual or entity with the responsibility to review or monitor the use of certain physical objects, or classes of physical objects, by others. The challenger may or may not be directly associated with, or be an employee of, a registration authority. In some embodiments, the challenger is responsible for ensuring that physical object users have lawful use rights and have registrations proving that the physical objects they are using are registered with one or more registration authorities. A challenger could include, for example, a state police officer responsible for checking vehicle registrations (issued by the state's department of motor vehicles) during traffic stops. Another example is an apartment complex supervisor tasked by the apartment complex administration with making sure that people in the complex's individual apartments have apartment registration documents. Yet another example is a state department of natural resources officer authorized to check state vessel registrations during periodic or random vessel inspections.

In some embodiments, a fourth role is a secondary borrower. As used herein, a secondary borrower refers to an entity or individual that obtains use or access rights in a physical object from a borrower or another secondary borrower. The party that lends a physical object to the secondary borrower may do so with or without the permission (or knowledge) of the owner of the physical object. An example of a secondary borrower includes a son who is loaned a boat for a night by his father during a week where the father has been loaned the boat by a friend of his who is the boat owner.

In some embodiments, a fifth role is that of a thief. In the context of some embodiments, a thief is an individual or entity that uses a physical object without the permission of an owner, a borrower, or a secondary borrower. The thief may or may not intend to return the physical object upon completion of his use of it. In some embodiments, a thief includes an individual or entity that has obtained a fraudulent copy of a registration for a physical object, the fraudulent copy having possibly been generated or derived from a genuine copy of a registration. An example of a thief is an employee who takes a photograph of the vehicle registration for his boss's car with his smart phone and then steals the car. Another example of a thief is a teenager who downloads onto his smart phone a forged copy of a stranger's hotel registration document for a hotel room and then breaks into the hotel room.

It is contemplated that the roles discussed above are context dependent and are determined in each instance based on an individual's relationship to a given physical object. In addition, in some embodiments, an individual can have multiple roles in instances where the individual has relationships with multiple objects. For example, a husband could be the owner of his vehicle, a borrower of his wife's vehicle, and a secondary borrower of his brother's boss's cottage (the boss having previously loaned out the cottage to the brother), all at the same time.

Turning to the figures, FIG. 1 is a diagrammatic illustration showing various interactions that may occur between mobile devices and other computer systems, in accordance with embodiments of a registration system 100 of the present invention.

In some embodiments, per registration system 100, each mobile device 110-118 is associated with (e.g., belongs to) an individual or entity that has one or more of the roles discussed in detail above. In the illustrated embodiment, mobile devices 110, 112, 114, 116, and 118 are associated with individuals having the roles of owner, borrower, challenger, secondary borrower, and thief, respectively. The mobile devices 110-118 may include, for example, any mobile or handheld electronic devices, such as laptops, mobile phones, smart phones, tablets, personal or enterprise digital assistants, and the like. The five mobile devices 110-118 of FIG. 1 are shown for illustrative purposes only; it is contemplated that dozens, hundreds, or even thousands of mobile devices may be used, consistent with some embodiments of the present invention. Further, in some embodiments, a particular mobile device can be associated with multiple roles (i.e., different roles in relationship to different physical objects).

In some embodiments, computer systems 102 and 104 are associated with a registration authority and a mobile application database manager, respectively. As is discussed in more detail below and shown in FIG. 6, computer systems 102 and 104 may comprise a wide variety of computers and computing environments. In some embodiments, the mobile application database manager of computer system 104 refers to the operator of a digital distribution platform for delivering software to an end user. An example of such a platform is an application store having downloadable applications (i.e., apps) for use on smart phones or other mobile devices. In some embodiments of registration system 100, a specific mobile application (or one of several similar mobile applications that are each designed to be compatible with a different operating system) is required in order for a registrant to use registration system 100. For example, a copy of a mobile application may be required to download a digital copy of a registration from a registration authority (e.g., the registration authority operating computer system 102). In some embodiments, a registrant has the option of not using registration system 100 or only uses a portion of the components of the system. This can occur, for example, where a registrant chooses to receive a paper copy of a registration from a registration authority or a copy that is digital but does not otherwise meet the requirements to be used with registration system 100 (e.g., in some embodiments, a pdf-copy of a registration that is not digitally-signed).

In some embodiments, a separate computer system 104 for a mobile application database manager is not required. This occurs, for example, where a registration authority allows the downloading of mobile applications from its own network (e.g., from computer system 102) or otherwise effectively acts as a mobile application database manager for its own mobile applications. It is further contemplated that in some embodiments no specialized mobile application are required for a user to effectively utilize a digital registration system according to embodiments. This occurs, for instance, where general purpose software preinstalled on a user's mobile device can be used instead of a downloaded mobile application.

Consistent with embodiments, there may be several different digital interactions 130-142 between the mobile devices 110-118 and the other computer systems 102 and 104 of the registration system 100. Each of 130-142 represent one or more interactions between a particular mobile device and a particular other computer system during the use of registration system 100. In some embodiments, the digital interactions 130-142 can be implemented by any number of any suitable communications media (e.g., wide area network (WAN), local area network (LAN), Internet, Intranet, etc.). Alternatively, mobile devices 110-118 and other computer systems 102 and 104 may be local to each other during digital interactions 130-142, and communicate via any appropriate local communication medium (e.g., local area network (LAN), hardwire, wireless link, Intranet, near field communication, Bluetooth connection, ad hoc wireless network, etc.). As discussed in more detail below and shown in FIG. 2, similar interactions amongst the mobile devices 110-118 as part of registration system 100 are also be contemplated in some embodiments.

Digital interactions 130, 132, 134, 136, and 138 represent interactions between a mobile application database manager (i.e., computer system 104) and mobile devices 110, 112, 114, 116, and 118, respectively. In some embodiments, the digital interactions 130-138 can include downloading (or, more specifically, taking the steps necessary to download) one or more mobile applications from the mobile application database manager to each applicable mobile device. In some embodiments, a downloaded application includes the software necessary to use and manage (e.g., receive, transmit, copy, share, etc.) digital copies of registrations in accordance with registration system 100. In some embodiments, digital interactions 130-138 can also include downloading periodic updates, patches, or new versions of applicable software. Further, some embodiments do not require any special permissions or verification steps for interactions 130-138 to occur, as the applicable software is designed and designated for use by the public generally. As an example of digital interaction 130, an owner of a vehicle can download a copy of his state's digital vehicle registration app from an application store (e.g., computer system 104) onto his smart phone (e.g., mobile device 110) so he can obtain a digital copy of his vehicle registration for his vehicle from his state's department of motor vehicles. An example of electronic interaction 132 is an individual (i.e., borrower) who wants to transport his friend's tiger across town, downloading his country's exotic animal registration software from a database (e.g., computer system 104) to his mobile phone (e.g., mobile device 112), so he can later get a digital copy of the tiger's registration certificate from his friend. Further, as an example of digital interaction 138, a professional criminal (i.e., thief) might download a copy of a city's boater registration mobile application to his tablet (e.g., mobile device 118) in the hopes of finding a way to modify or reverse engineer the application in order to create fraudulent copies of boater registrations.

In some embodiments, in contrast with digital interactions 130-138, digital interactions 140 and 142 represent interactions between the computer system 102 of a registration authority and mobile devices 110 and 114, respectively. In some embodiments, digital interactions 140 and 142 are the means by which a registration authority communicates with mobile devices regarding particular registered physical objects, specifically, or a given registration system, generally. In some embodiments, the computer system 102 of a registration authority can require that specific credentials (e.g., passwords, etc.) be provided in order for a user of the computer system to access specific content regarding the registration system 100 or content regarding a particular registered physical object within the system. In some embodiments, this means that access to content stored by the registration authority can be less broadly disseminated than content stored by its associated mobile application database manager (e.g., in situations where the applicable mobile applications are downloadable by the public generally).

In some embodiments, digital interactions 140 (i.e., between the computer system 102 of a registration authority and a mobile device 110 of an owner) include, for example, downloading master digital copies of registrations or updated master digital copies of registrations, uploading information about registrants or registered objects, or exchanging information regarding the validity of one or more digital copies of a registration. More specifically, an example of an electronic interaction 140 includes an owner of an automobile downloading a master digital copy of a vehicle registration for his vehicle on his smart phone. Another example is an apartment tenant updating her last name on her apartment registration document after she is married.

In some embodiments, a digital interaction 142 is between a registration authority (102) and a challenger (114) associated with the registration authority. Examples of digital interactions 142 include downloading a digital registration verification database and downloading updates to a digital registration verification database. More specifically, an example of a digital interaction 142 includes a state wildlife officer downloading the state's database of valid digital copies of wild animal registrations.

In some embodiments, each of the digital interactions 130-142 incorporate one or more security features. Per embodiments, the computer systems 102 and 104 incorporate digital certificates (e.g., one or more electronic documents managed in accordance with the X.509 standard for a public key infrastructure) in interactions with the devices 110-118. For example, an owner's mobile device 110 may be able to use a digital certificate sent in conjunction with a downloaded copy of a mobile application in order to verify that the app was sent by the mobile application database manager (104).

In some embodiments, security features incorporated in digital interactions 130-142 take the form of key pairs, including asymmetric key pairs. For example, in a digital interaction 140, Rivest-Shamir-Adleman (RSA) public-key encryption could be used when transmitting a particular digitally-signed digital copy of a registration from a registration authority (102) to an owner of a particular registered physical object (110). As another example, the same encryption scheme could be used to transfer an entire digital registration verification database from a registration authority (102) to a challenger (114) associated with that authority. One skilled in the art would appreciate that many other encryption schemes could be suitable for use with some embodiments of the invention.

Figure 2:
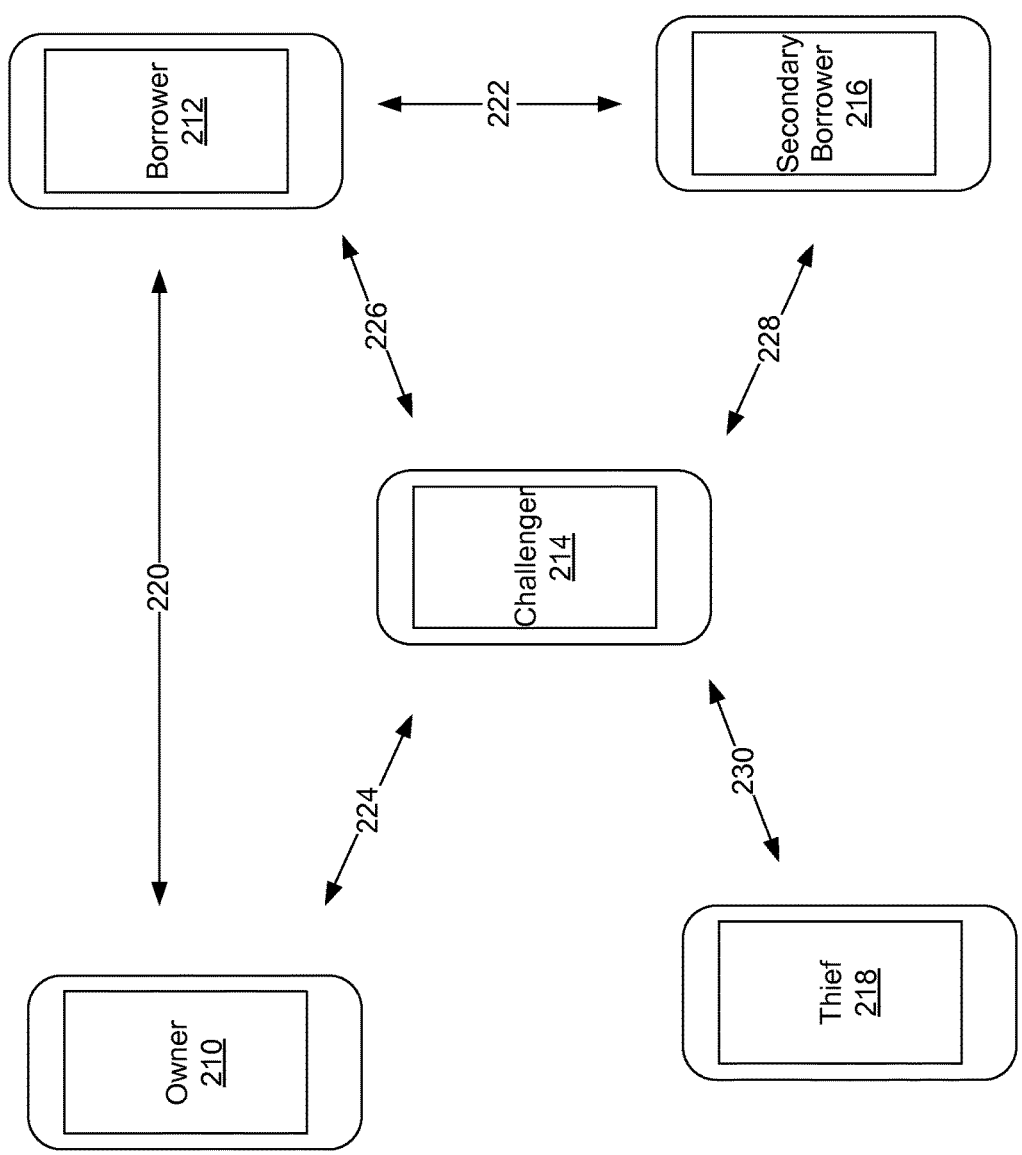
FIG. 2 is a diagrammatic illustration showing various interactions that may occur among mobile devices, in accordance with embodiments of a registration system of the present invention.

Turning to FIG. 2, shown is a diagram illustrating various interactions that may occur among mobile devices, in accordance with embodiments of a registration system of the present invention. In some embodiments, mobile devices 210-218 correspond to mobile devices 110-118 of registration system 100.

In some embodiments, the digital interactions 220-230 among mobile devices 210-218 are similar to the digital interactions 130-142 of registration system 100. In some embodiments, each of digital interactions 220-230 represent one or more interactions between a particular mobile device and a particular other mobile device during the use of a registration system. In some embodiments, the digital interactions 220-230 can be implemented by any number of any suitable communications media (e.g., wide area network (WAN), local area network (LAN), Internet, Intranet, etc.). Alternatively, mobile devices 210-218 are local to each other during applicable digital interactions 220-230, and communicate via any appropriate local communication medium (e.g., local area network (LAN), hardwire, wireless link, Intranet, near field communication, Bluetooth connection, ad hoc wireless network, etc.). In some embodiments, short range communications not requiring intermediaries may be used for these digital interactions. In some embodiments, digital interactions 220-230 incorporate security features, that are the same or different from those features discussed with reference to the digital interactions 130-142 of FIG. 1.

(e.g., digital certificates, public key encryption schemes, HTTPS (i.e., TSL or SSL as sublayers under HTTP), etc.)

In some embodiments, digital interaction 220 is between an owner's mobile device 210 and a borrower's mobile device 212. In some embodiments, electronic interaction 220 includes creating and transmitting a digital copy of a registration from an owner (210) to a borrower (212). Further, examples of embodiments of such digital interactions 220 are discussed in more detail below and shown in FIG. 3.

Taking the sharing of registrations a step further, digital interaction 222 may include creating a second digital copy of the digital copy of the registration received by the borrower (212) (from the owner (210)) and transmitting (or attempting to transmit) the second digital copy of the registration to a secondary borrower (216). In some embodiments, one or more security barriers are in place to prevent a borrower (212) from copying or re-transmitting a digital copy of a registration to a secondary borrower's mobile device 216. In some embodiments, to help to prohibit this secondary borrowing, a copy of a mobile application on a borrower's mobile device prohibits attempts at the sharing of any copies of a particular registration with a secondary borrower and informs the borrower that such an action is not permissible (e.g., through an error message on a graphic user interface).

In some embodiments, certain security features include a requirement that each digital copy of a registration incorporate a digital certificate (e.g., an X.509 digital certificate). Further, each digital copy may include multiple structural components (e.g., serial number, issuer, valid to and valid from dates, etc.). In some embodiments, an owner is able to adjust or control certain aspects of these components in a new digital copy of a registration that is transferred to a borrower. This can aid in limiting secondary borrowing as a borrower may not be able to generate a new digital certificate for transfer to a secondary borrower. In some embodiments, another security feature includes a requirement that a secret key be used when generating a digital copy of a registration. By storing such a secret key in the keystore of an owner's mobile device 210, a borrower will not be able to generate a new digital copy of the registration because he will lack the ability to access that key.

In some embodiments, another security feature is that digital interactions 220 and 222 each involve a series a steps whereby a short range communication medium is used to establish a secure connection between respective devices (e.g., between mobile devices 210 and 212 or between mobile devices 212 and 216). In some embodiments, near field communication and Bluetooth are suitable short range communication protocols.

Also included in FIG. 2 are digital interactions 224, 226, 228, and 230, which, in some embodiments, represent one or more digital interactions between a challenger's mobile device 214 and other mobile devices belong to an owner 210, a borrower 212, a secondary borrower 216, and a thief 218, respectively. These electronic interactions include, for example, challenges by the challenger (214) wherein the other mobile device is prompted to produce a valid digital copy of a registration. Such challenges are discussed in more detail below and shown in the flow chart of FIG. 5.

Figure 3:
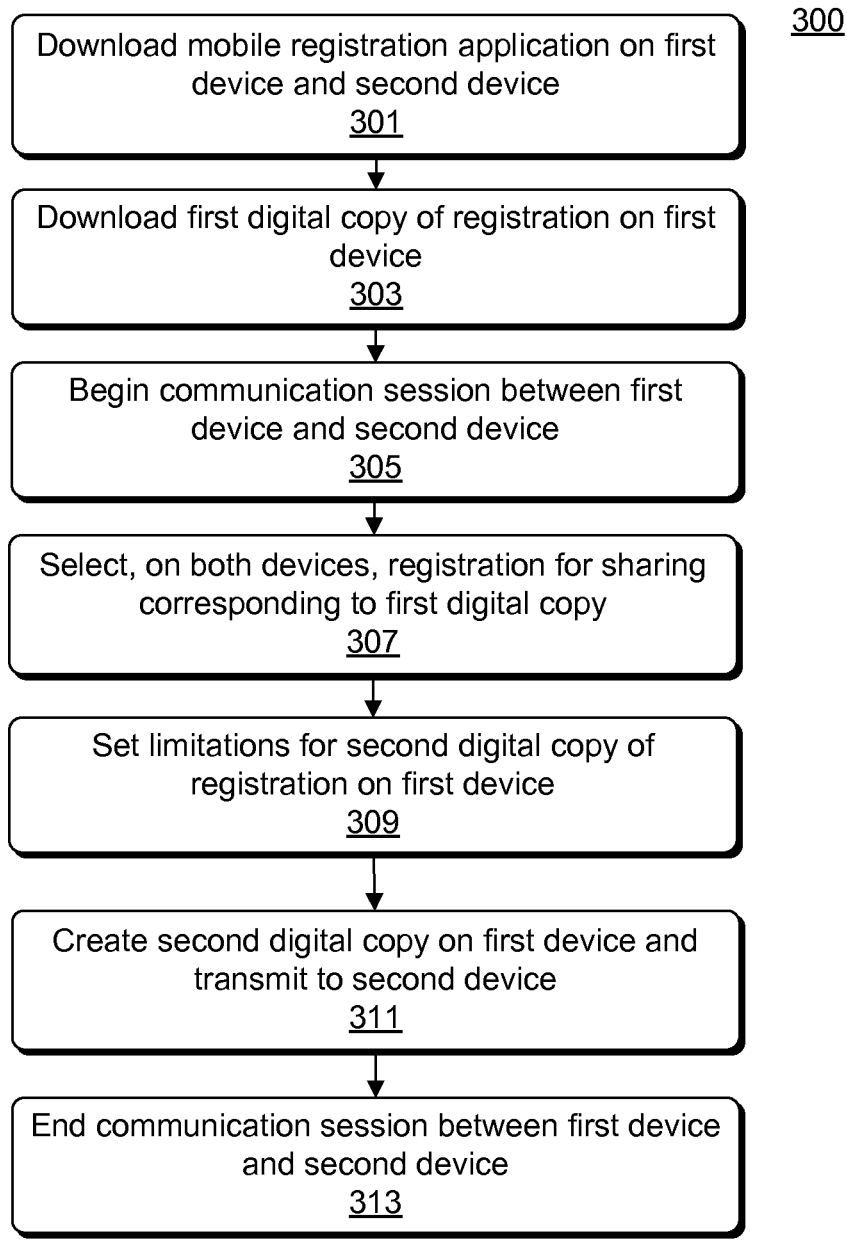
FIG. 3 is a flow chart of a method for sharing digital copies of a registration between two mobile devices, in accordance with embodiments of the present invention.

Turning now to FIG. 3, a flow chart of a method 300 for sharing digital copies of a registration between two mobile devices in accordance with embodiments of the present invention is shown. Per 301, in some embodiments, a copy of a mobile registration application is downloaded on both a first mobile device (e.g., an owner's mobile device) and a second mobile device (e.g., a borrower's mobile device) prior to an applicable digital interaction between the two devices. These downloads are each be performed, for example, by using one of digital interactions 130-138 of FIG. 1. Per 303, a first digital copy of a specific registration is downloaded (e.g., by using the mobile application) onto the first device. Per embodiments, a communication session is begun between the first device and the second device, as shown in block 305. Next, per 307 the two parties to the interaction use copies of the mobile application on their respective devices to select the specific registration that is desired to be shared with the user of the second device by the user of the first device. This selection can be made, for example, through a graphic user interface on each mobile device. In some embodiments, only those registrations for which the first device user has the right to transfer a digital copy are shown. Per 309, upon the selection, by both parties, of the specific registration corresponding to the first digital copy, the first device prompts its user to select limitations on certain criteria for the second digital copy to be created. For example, the first device may prompt the user to select an expiration date for the new digital copy or prompt the user to determine whether the new digital copy should be transferable from the second device to other devices (e.g., a secondary borrower's device). Per 311, in some embodiments, once the selection is made by the user of the first device, the first device generates the second digital copy of the registration from the first digital copy of the registration and transmits the second digital copy to the second device. Upon completion of a successful transmission of the second digital copy, the communication session, per block 313, is ended.

Figure 4:
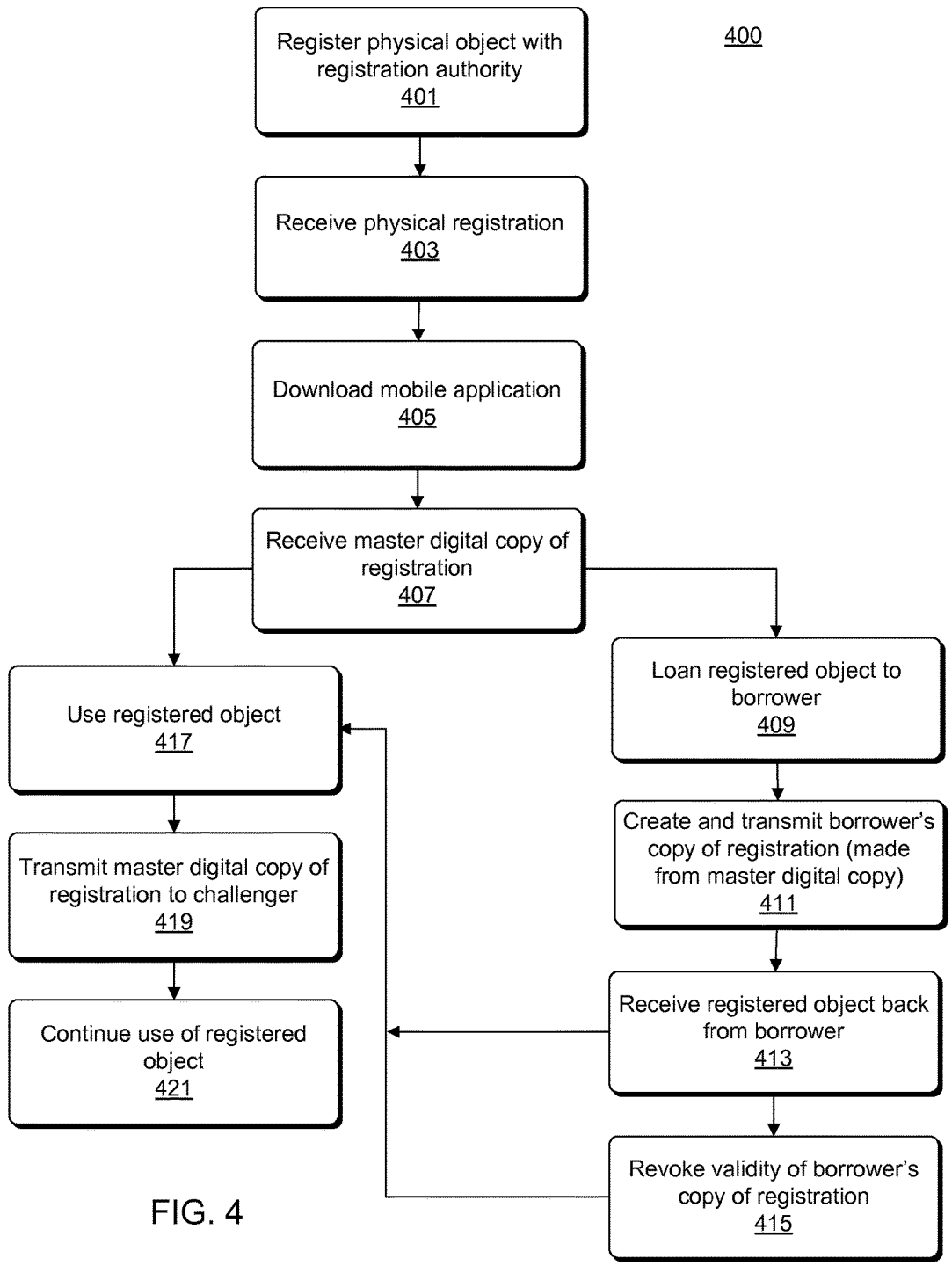
FIG. 4 is a flow chart illustrating a method for managing the use of a registered physical object and the sharing of digital copies of an associated registration, in accordance with embodiments of the present invention.

Turning now to FIG. 4, shown is a flow chart of a method 400 for managing the use of a registered physical object and the sharing of digital copies of an associated registration, in accordance with embodiments of the present invention. Per block 401, an individual or entity registrant (e.g., an owner) registers a physical object with a registration authority. In some embodiments, this can be done in person (e.g., at a department of motor vehicles office), via a website, or in any other suitable manner that is acceptable to the registration authority. In block 403, a physical copy of a registration is received by the registrant by appropriate means; for example, the physical copy could be a plastic laminated registration document that is received through the mail at the registrant's address. For another example, the physical copy of the registration could be a temporary copy that is only valid for a short period of time to allow for a more permanent registration to be obtained by the registrant.

In some embodiments, per block 405, the registrant downloads a copy of a mobile application on a mobile device; the application can include, for example, a software application downloaded from the mobile application database manager (100) of FIG. 1. It is contemplated that in some embodiments, an application can be downloaded by an individual prior to beginning the registration process and used for initially registering a physical object with a registration authority (i.e., used in block 401). Next, per block 407, the registrant receives a master digital copy of his registration on his mobile device. In some embodiments, the master digital copy of the registration can be received by the registrant's mobile device from the registration authority (e.g., from computer system 102 of FIG. 1) or can be received from another entity authorized by the registration authority to issue digital copies of registrations. In some embodiments, the master digital copy of the registration received by the registrant is not validly transferable from the registrant's mobile device to any other mobile device. In some embodiments, the registrant is required to enter certain credentials to prove his identity and relationship to the registered object before he is allowed to download the digital copy of the registration.

In block 409, the registrant chooses to loan the registered object to a borrower. In some embodiments, this occurs long after the registrant receives the master digital copy of the registration from the registration authority. Per block 411, the registrant creates a new digital copy (e.g., a borrower's copy) from his master digital copy of the registration and transmits the new digital copy of the registration to a mobile device belonging to the borrower of the object; for example, this process could correspond to electronic interaction 220, discussed in reference to FIG. 2 above. In some embodiments, the transferred digital copy can take the form of a peripheral digital copy or a stationary digital copy. In this context, a peripheral digital copy refers to a valid digital copy of a registration that cannot be used to make other valid digital copies of the registration. This occurs, for instance, where the registrant does not want the borrower to be able to create other digital copies of the registration that he could then provide to multiple other potential users (e.g., secondary borrowers); or this could occur in instances where the mobile application does not allow an owner to create other master digital copies from his master digital copy of his registration. Further, in this context, a stationary digital copy of a registration refers to a peripheral digital copy of a registration that is further limited in that it can only be validly transferred between electronic device when the receiving device is a challenger's device (e.g., challenger's mobile device 214) or when the transmitting device is the device that created it (e.g., owner's mobile device 210 or a registration authority's computer system). This occurs, for instance, when the registrant does not want the borrower to be able to lend his digital copy of the registration to any other mobile device (i.e., where the owner may be attempting to prohibit all secondary borrowing).

Next, in some embodiments, per block 413, the registrant receives the registered physical object back from the borrower. This occurs, for example, after the borrower has finished using the registered object. Per block 415, the registrant uses his mobile device to revoke the validity of the digital copy of the registration on the borrower's mobile device. In some embodiments, the borrower is notified by his device that his digital copy of the registration has been revoked; for example, the borrower may be notified by the fact that the registration is no longer viewable on his device. In some embodiments, revoking the validity of the borrower's copy of the registration is required before the registrant's copy can be used. This occurs, for example, where the registration authority only allows one digital copy of a registration to be validly usable at a time. Per some embodiments, the revocation of the borrower's copy of the registration takes the form of a communication to the registration authority from the registrant's mobile device, wherein the registrant notifies the registration authority that the validity of an individually numbered copy of a digital certificate (i.e., the certificate copy associated with the borrower's digital copy of the registration) has been revoked. The registration authority adds this notification to an appropriate digital registration verification database. Per some embodiments, this notification serves to effectively "black-list" the borrower's copy of the registration.

Continuing method 400 at block 417, the registrant resumes use of the registered object that was returned to him by the borrower. In some embodiments, a registrant may not revoke a borrower's copy of a registration until after he has resumed using the physical object (i.e., the registrant may perform block 417 before performing block 415). In some embodiments, the registrant may choose not to revoke the validity of the borrower's copy at all (i.e., the registrant may avoid performing block 415 altogether). This may occur, for example, where the borrower is a trusted individual or someone who the registrant is likely to let borrow the registered physical object often (e.g., where a father plans to let his son borrow his boat every other weekend during a summer). Further, a registrant also may choose not to manually revoke a borrower's copy of a registration in instances where the borrower's copy, as part of its original generation, is scheduled to be revoked (and, in some embodiments, expunged from the GUI of the borrower's mobile device) automatically within a given time period. In some embodiments of method 400, the registrant uses the registered object without lending it out first (i.e., the registrant performs 417 without performing any of 409-415). Further, it is contemplated that, in some embodiments, multiple borrowers could be provided with different digital copies of a registration, all of which are copied (i.e. generated) from the same master digital copy of the registration residing the registrant's mobile device; further, in some embodiments, all of the borrowers' copies could be valid at the same time or for different terms.

Next, per block 419, the registrant transmits his master digital copy of the registration to a challenger. This occurs, for example, when the registrant is subject to a face to face challenge by the challenger while he is using the registered object. Such a challenge is discussed in more detail below in reference to FIG. 5. Upon completion of the challenge, per block 421, the registrant continues his use of the registered object.

It is contemplated that in some embodiments many iterations of all or a portion of method 400 can occur for a given registrant. Further, many registrants within a given registration system could each perform iterations of all or a portion of the method 400. Moreover, a given registrant may have multiple registered objects (i.e., multiple different registrations) at the same time (e.g., an individual who owns two or more registered vehicles).

Figure 5:
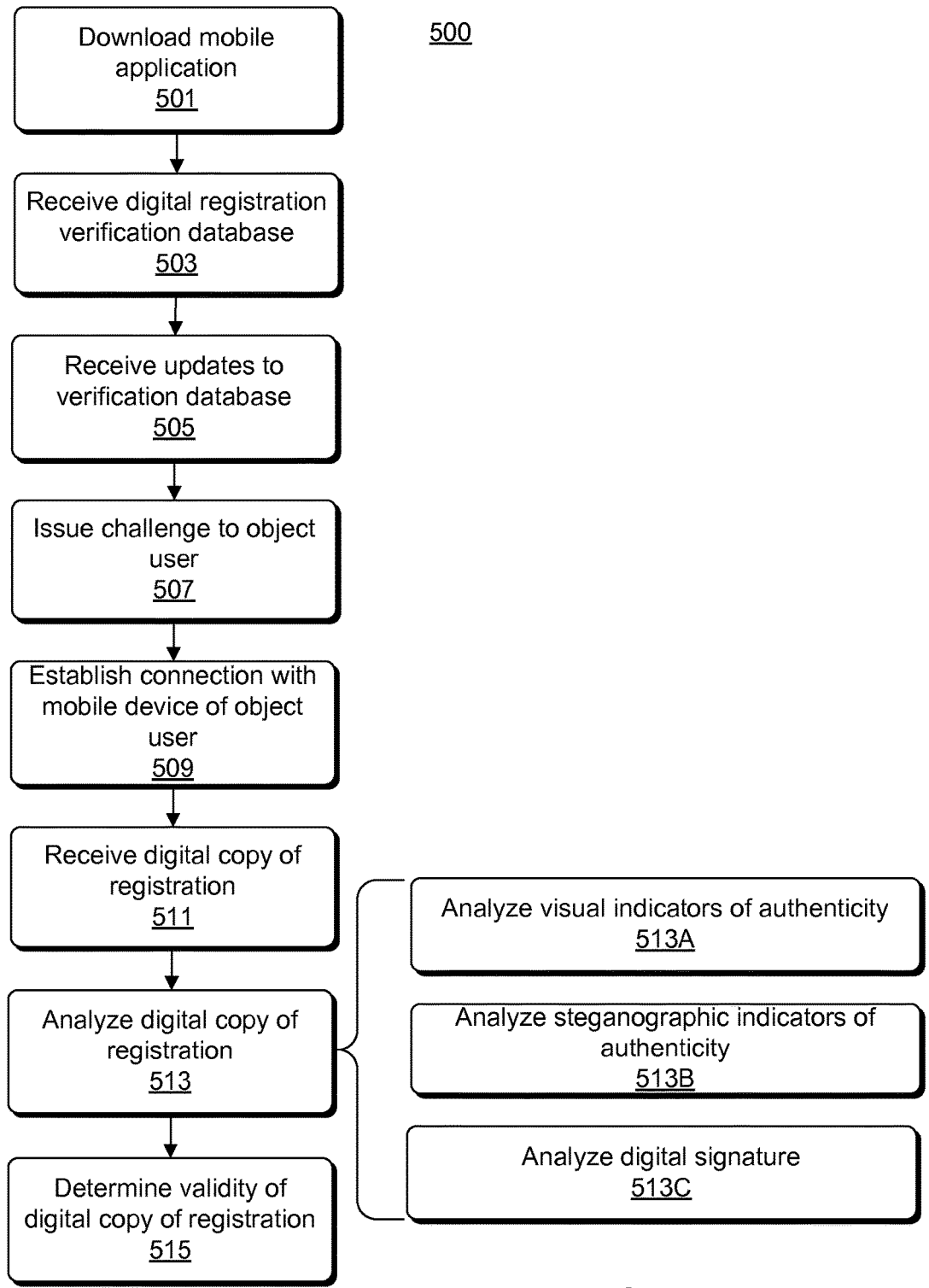
FIG. 5 is a flow chart of a method for challenging a user of a physical object using a challenger's device, in accordance with embodiments of the present invention.

Turning now to FIG. 5, a flow chart of a method 500 for challenging a user of a physical object using a challenger's device, in accordance with embodiments of the present invention, is shown. In this context, a challenger's device refers to an electronic device that can be used by a challenger to determine whether digital copies of registrations are valid. Such a device includes, for example, a mobile device, such as mobile device 114 of FIG. 1. Per 501, a challenger downloads a copy of a mobile application onto an electronic device. This could occur, for example, per electronic interaction 114 of FIG. 1. In some embodiments, this is the same mobile application that is intended for download by other (non-challenger) users of a registration system; if such is the case, the challenger could be required to enter special credentials into the application once it is downloaded in order to access features that are specific to challengers authorized by a given registration authority. In some embodiments, the version of the application used by a challenger is entirely different from the version of the mobile application used by registrants under the same registration system.

In some embodiments, per block 503, the challenger receives a copy of a digital registration verification database. In some embodiments, this takes the form of a download from the computer system of the registration authority to the challenger's electronic device. In some embodiments, the database includes information that can be used by the challenger to verify the validity of digital copies of registrations (e.g., digital keys, lists of expired or otherwise invalidated digital copies of registrations, etc.). Per block 505, the challenger could also receive updates to the copy of the database stored on his challenger's device. These updates could, for example, take the form of regularly or periodically sent lists of newly expired digital certificates that are delivered from the registration authority.

Per 507, the challenger stops (i.e., temporarily detains) and challenges a user of an object that is subject to registration requirements. This occurs, for instance, where the challenger has reason to believe that the object has not been properly registered. In some embodiments, the challenger issues the challenge during a face to face encounter between the challenger and the object user (e.g., during a traffic stop of a vehicle by a police officer). In some embodiments, digital interactions corresponding to one or more of the digital interactions 224-230 of FIG. 2, are initiated. Per 509, a digital connection is established between the object user's mobile device and the challenger's electronic device. In some embodiments, this connection is through a secure short range communication medium (e.g., near field communication, Bluetooth connection, ad hoc wireless network, etc.). In some embodiments, the physical object user downloaded an appropriate mobile application from a database prior to the encounter. The user then selects a desired digital copy of a registration and sends the desired copy (i.e., transmits a duplicate of the desired copy) to the challenger's electronic device. Per 511, the copy is received by the challenger's electronic device.

The challenger then uses the challenger's electronic device, per block 513, to analyze the transmitted copy of the registration. Several components could be included in the digital copy that may aid in this analysis. In some embodiments, valid digital copies of registrations incorporate certain visual indicators of authenticity (e.g., color patterns, holographic images, etc.), which are analyzed by the challenger, per block 513A. In addition, a copy of a registration could have an expiration date that the challenger can use to verify that the copy is not expired. Further, in some embodiments, digital copies incorporate steganographic indicators of authenticity. Per block 513B, the challenger's device may be able to detect these steganographic indicators or be able to use these indicators to present a coherent image to the challenger (e.g., where digital watermarking is used) when the challenged copy of a registration is valid. Further, per 513C, in some embodiments, valid digital copies of registrations use digital signatures (e.g., incorporated as part of a digital certificate) that are analyzed by the challenger to determine the validity of a given copy of a registration.

In some embodiments, block 513 further incorporates use of the digital registration verification database. For example, a serial number of the user's digital copy of the registration could be compared against a list of serial numbers associated with known expired or otherwise invalidated digital copies of registrations.

Per 515, the challenger determines, based on the analysis, whether the digital copy of the registration on the user's mobile device is valid. There are many alternative scenarios for how an analysis 513 and determination 515 could proceed. In one example, the user is the owner of the physical object and his copy of the registration includes a valid digital signature that is authenticated by the challenger's device. In another example, the user is a thief who stole the physical object and used specialized software to make a fraudulent digital copy of a registration. In this example, the visual indicators may be good enough to fool the challenger, but the challenger's device reveals that the digital signature on the fraudulent copy is invalid. In yet another example, the user of the object is a secondary borrower who, having been unable to transfer a valid copy of the registration for the object from a borrower's device, used his mobile device to take a photograph of the valid digital copy of the registration. In this example, upon receiving the photograph, the challenger's device is unable to recognize the file type and notifies the challenger that the copy is invalid. Yet another example might be that the user is a borrower who received a valid copy of the registration from the owner, but the owner revoked the borrower's copy a week before the challenger intercepted the borrower. In this example, the challenger's device compares the serial number of the copy with the serial numbers in the digital verification database and, upon locating that serial number in the database, rejects the copy as expired and invalid.

In some embodiments, the challenger may respond differently depending on his analysis and determination. For example, if the challenger determines that the digital copy of the registration is a forgery, he might arrest the user of the physical object. As another example, if the challenger determines that the digital copy of the registration was properly issued but is now expired, he may let the user leave with a warning or a citation. As yet another example, if the challenger determines that the digital copy is valid, he may allow the user to leave without penalty. In some embodiments, the challenger deletes the transmitted copy of the registration upon completion of the encounter with the physical object user.

It is contemplated that, in some embodiments, the challenger of method 500 is not associated with the registration authority for the physical object. This may occur, for example, where the registration authority is the department of motor vehicles for one state and the challenger is a peace officer for another state.

It is further contemplated that, in some embodiments, one or more steps of method 500 could occur remotely from the challenger's device and the mobile device of the object user. This could occur for instance where the challenger does not download a copy of a verification database, but instead transmits the digital copy of a registration obtained from the user directly to the registration authority (e.g. through an internet connection), whereupon the registration authority makes the comparison of the database with that digital copy and transmits the results back to the challenger's device.

Figure 6:
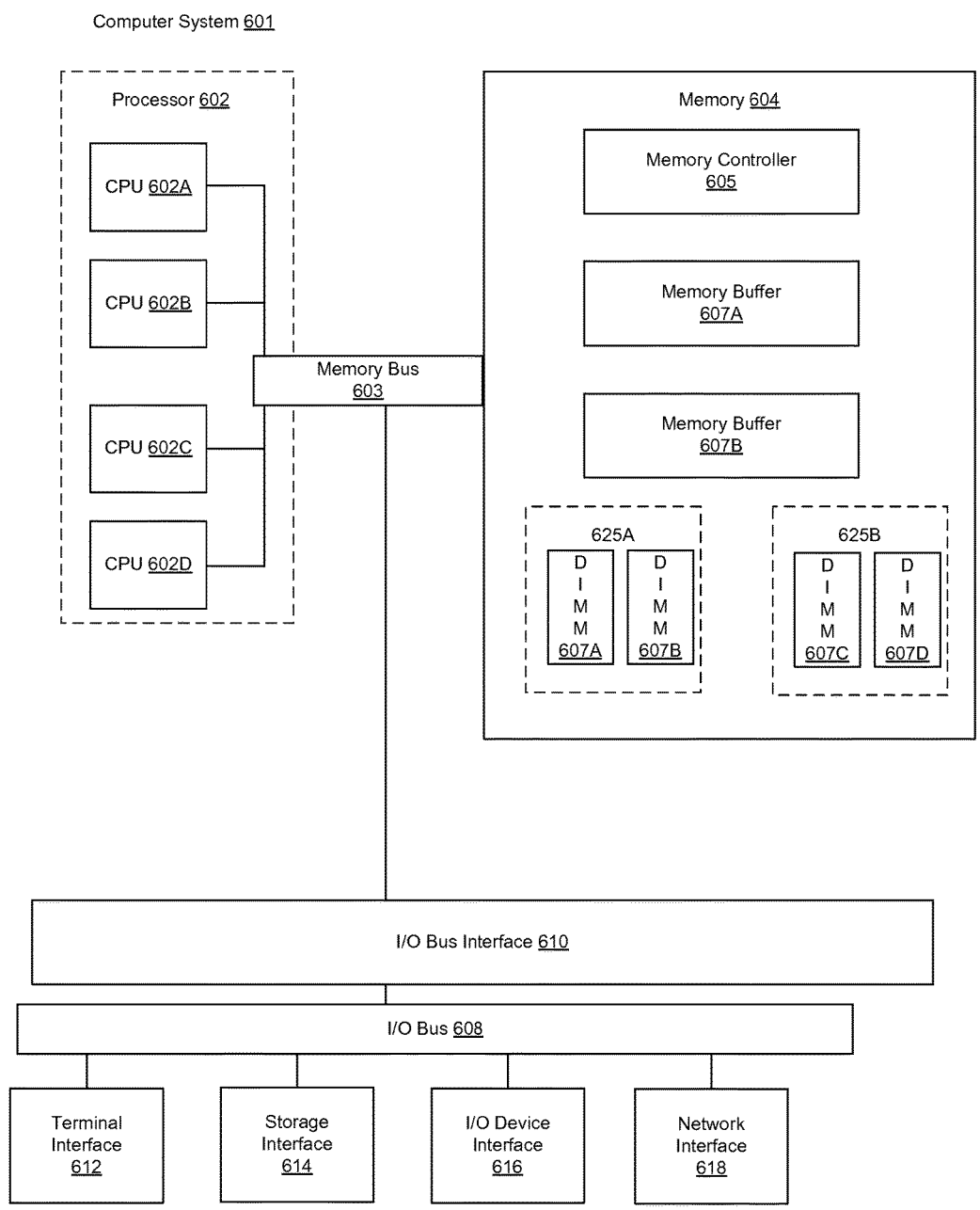
FIG. 6 depicts a high-level block diagram of an example computer system that may be used in implementing one or more embodiments of the present invention.

FIG. 6 depicts a high-level block diagram of an example computer system that could be used in implementing one or more embodiments of the invention. For example, one or more computer systems described in reference to this figure could correspond to computer systems 102 and 104 or mobile devices 110-118 of FIG. 1. The major components of the computer system 601 comprise one or more CPUs 602, a memory subsystem 604, a terminal interface 612, a storage interface 614, an I/O (Input/Output) device interface 616, and a network interface 618, all of which are communicatively coupled, directly or indirectly, for inter-component communication via a memory bus 603, an I/O bus 608, and an I/O bus interface unit 610.

The computer system 601 contains one or more general-purpose programmable central processing units (CPUs) 602A, 602B, 602C, and 602D, herein generically referred to as the CPU 602. In an embodiment, the computer system 601 contains multiple processors typical of a relatively large system; however, in another embodiment the computer system 601 alternatively is a single CPU system. Each CPU 602 executes instructions stored in the memory subsystem 604 and comprises one or more levels of on-board cache.

In an embodiment, the memory subsystem 604 comprises a random-access semiconductor memory, storage device, or storage medium (either volatile or non-volatile) for storing data and programs. In another embodiment, the memory subsystem 604 represents the entire virtual memory of the computer system 601, and also includes the virtual memory of other computer systems coupled to the computer system 601 or connected via a network. The memory subsystem 604 may be conceptually a single monolithic entity, but in other embodiments the memory subsystem 604 may be a more complex arrangement, such as a hierarchy of caches and other memory devices. For example, memory could exist in multiple levels of caches, and these caches could be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 604 contains elements for control and flow of memory used by the CPU 602. This includes all or a portion of the following: a memory controller 605, one or more memory buffers 606A and 606B and one or more memory devices 625A and 625B. In the illustrated embodiment, the memory devices 625A and 625B are dual in-line memory modules (DIMMs), which are a series of dynamic random-access memory (DRAM) chips 607A-607D (collectively referred to as 607) mounted on a printed circuit board and designed for use in personal computers, workstations, and servers. The use of DRAMs 607 in the illustration is exemplary only and the memory array used may vary in type as previously mentioned. In various embodiments, these elements are connected with buses for communication of data and instructions. In other embodiments, these elements are combined into single chips that perform multiple duties or integrated into various types of memory modules. The illustrated elements are shown as being contained within the memory subsystem 604 in the computer system 601. In other embodiments the components are arranged differently and have a variety of configurations. For example, the memory controller 605 may be on the CPU 602 side of the memory bus 603. In other embodiments, some or all of them are on different computer systems and may be accessed remotely, e.g., via a network.

Although the memory bus 603 is shown in FIG. 6 as a single bus structure providing a direct communication path among the CPUs 602, the memory subsystem 604, and the I/O bus interface 610, the memory bus 603 could in fact comprise multiple different buses or communication paths, which are arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 could, in fact, contain multiple I/O bus interface units 610, multiple I/O buses 608, or both. While multiple I/O interface units are shown, which separate the I/O bus 608 from various communications paths running to the various I/O devices, in other embodiments some or all of the I/O devices are connected directly to one or more system I/O buses.

In various embodiments, the computer system 601 is a multi-user mainframe computer system, a single-user system, or a server computer or similar device that has little or no direct user interface, but receives requests from other computer systems (clients). In other embodiments, the computer system 601 is implemented as a desktop computer, portable computer, laptop or notebook computer, tablet computer, pocket computer, telephone, smart phone, network switches or routers, or any other appropriate type of electronic device.

FIG. 6 is intended to depict the representative major components of an exemplary computer system 601. But individual components may have greater complexity than represented in FIG. 6, components other than or in addition to those shown in FIG. 6 may be present, and the number, type, and configuration of such components may vary. Several particular examples of such complexities or additional variations are disclosed herein. The particular examples disclosed are for example only and are not necessarily the only such variations.

The memory buffers 606A and 606B, in this embodiment, may be intelligent memory buffers, each of which includes an exemplary type of logic module. Such logic modules may include hardware, firmware, or both for a variety of operations and tasks, examples of which include: data buffering, data splitting, and data routing. The logic module for memory buffers 606A and 606B control the DIMMs 607A and 607B, the data flow between the DIMMs 607A and 607B and memory buffers 606A and 606B, and data flow with outside elements, such as the memory controller 605. Outside elements, such as the memory controller 605 have their own logic modules that the logic modules of memory buffers 606A and 607B interact with. The logic modules can be used for failure detection and correcting techniques for failures that may occur in the DIMMs 607A and 607B. Examples of such techniques include: Error Correcting Code (ECC), Built-In-Self-Test (BIST), extended exercisers, and scrub functions. The firmware or hardware could add additional sections of data for failure determination as the data is passed through the system. Logic modules throughout the system, including but not limited to the memory buffers 606A and 606B, memory controller 605, CPU 602, and even the DRAM 607 may use these techniques in the same or different forms. These logic modules could communicate failures and changes to memory usage to a hypervisor or operating system. The hypervisor or the operating system is a system that is used to map memory in the system 601 and tracks the location of data in memory systems used by the CPU 602. In some embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing digital copies of a registration of a specified physical object with a registration authority, the computer program product comprising a non-transitory computer readable storage medium having program instructions embodied therewith, the program instructions executable by at least one computer to cause the at least one computer to:

transmit a master digital copy of the registration to a first mobile device, the registration being proof that the specified physical object has been registered with the registration authority; and receive from a second mobile device a valid peripheral digital copy of the registration showing that the specified physical object has been registered with the registration authority, the valid peripheral digital copy of the registration having been made by the first mobile device from the master digital copy of the registration and sent from the first mobile device to the second mobile device, and including a security feature preventing the valid peripheral digital copy of the registration from being used to make other valid digital copies of the registration that would show registration of the specified physical object with the registration authority to limit copying of the registration.

2. The computer program product of claim 1, the program instructions executable by the at least one computer to further cause the at least one computer to:

analyze the peripheral digital copy of the registration; and based on the analysis of the peripheral digital copy of the registration, determine that the peripheral digital copy of the registration is valid.

3. The computer program product of claim 1, wherein the peripheral digital copy of the registration comprises a digital signature, the program instructions executable by the at least one computer to further cause the at least one computer to:

analyze the digital signature;

and based on the analysis of the digital signature, determine that the peripheral digital copy of the registration is valid.

4. The computer program product of claim 3, wherein the peripheral digital copy of the registration further comprises a steganographic indicator of authenticity and a visual indicator of authenticity, the program instructions executable by the at least one computer to further cause the at least one computer to:

analyze the steganographic indicator of authenticity and the visual indicator of authenticity.

5. The computer program product of claim 2, wherein the at least one computer comprises a computer system of a representative of the registration authority and an electronic device, wherein the transmitting the master digital copy of the registration is from the computer system of the representative and to the first mobile device, and wherein the receiving the peripheral digital copy of the registration is by the electronic device from the second mobile device, the second mobile device having previously received the peripheral digital copy of the registration from the first mobile device.

6. The computer program product of claim 5, wherein the electronic device is a third mobile device of a challenger, and wherein the analyzing the peripheral digital copy of the registration is performed by the challenger by using the third mobile device.

7. The computer program product of claim 6, wherein the receiving the peripheral digital copy is performed via a direct wireless connection between the second mobile device and the third mobile device.

8. The computer program product of claim 5, wherein the peripheral digital registration comprises a stationary registration, the stationary registration being only validly transferable between a transmitting device and a receiving device when the receiving device is an electronic device of an authorized challenger or the transmitting device is the first mobile device.

9. The computer program product of claim 5, wherein the physical object is a first vehicle, wherein the registration is a first vehicle registration, wherein the registration authority is a governmental entity, wherein the first mobile device belongs to a first owner of the first vehicle, the first owner having previously registered the first vehicle with the governmental entity, wherein the second mobile device belongs to a first borrower of the first vehicle, wherein the electronic device belongs to a peace officer, and wherein the receiving the peripheral digital copy of the registration occurs both during a face to face interaction between the first borrower and the peace officer and contemporaneously with the operation of the first vehicle by the first borrower.

10. A system for managing digital copies of a registration of a specified physical object with a registration authority, the system comprising: at least one computer, the at least one computer configured to:
transmit a master digital copy of the registration to a first mobile device, the registration being proof that the specified physical object has been registered with the registration authority; and
receive from a second mobile device a valid peripheral digital copy of the registration showing that the specified physical object has been registered with the registration authority, the valid peripheral digital copy of the registration having been made by the first mobile device from the master digital copy of the registration and sent from the first mobile device to the second mobile device and including a security feature preventing the valid peripheral digital copy of the registration from being used to make other valid digital copies of the registration that would show registration of the specified physical object with the registration authority to limit copying of the registration.

11. The system of claim 10, wherein the peripheral digital copy of the registration comprises a digital signature, and wherein the at least one computer is further configured to:
analyze the digital signature; and
based on the analysis of the digital signature, determine that the peripheral digital copy of the registration is valid.

12. The system of claim 11, wherein the at least one computer comprises a computer system of a representative of the registration authority and an electronic device, wherein the transmitting the master digital copy of the registration is from the computer system of the representative and to the first mobile device, and wherein the receiving the peripheral digital copy of the registration is by the electronic device from the second mobile device, the second mobile device having previously received the peripheral digital copy of the registration from the first mobile device.

13. The system of claim 12, wherein the electronic device is a third mobile device of a challenger, wherein the receiving the peripheral digital copy is performed via a direct wireless connection between the second mobile device and the electronic device, the direct wireless connection comprising at least one of an ad hoc wireless network, a Bluetooth connection, and a near field communication, and wherein the analyzing the digital signature is performed by the challenger by using the third mobile device.

14. The system of claim 12, wherein the peripheral digital registration comprises a stationary registration, the stationary registration being only validly transferable between a transmitting device and a receiving device when the receiving device is an electronic device of an authorized challenger or the transmitting device is the first mobile device, wherein the physical object is a first vehicle, wherein the registration is a first vehicle registration, wherein the registration authority is a governmental entity, wherein the first mobile device belongs to a first owner of the first vehicle, the first owner having previously registered the first vehicle with the governmental entity, wherein the second mobile device belongs to a first borrower of the first vehicle, wherein the electronic device belongs to a peace officer, and wherein the receiving the peripheral digital copy of the registration occurs both during a face to face interaction between the first borrower and the peace officer and contemporaneously with the operation of the first vehicle by the first borrower.

15. The system of claim 10, wherein:
the at least one computer comprises a computer system of a representative of the registration authority, and first and second mobile devices;
the computer system is configured to transmit the master digital copy of the registration to the first mobile device; and
the first mobile device is configured for:
transferring the valid peripheral digital copy of the registration to the second mobile device; and
prompting a user of the first mobile device, prior to the transferring the valid peripheral digital copy of the registration to the second mobile device, to select a limitation to prevent the valid peripheral copy of the registration from being used on the second mobile device to make other valid digital copies of the registration.

16. The system of claim 15, wherein the first mobile device is further configured for:
notifying the registration authority that the validity of the peripheral digital copy of the registration has been revoked.

17. A computer program product for managing digital copies of a registration of a specified physical object with a registration authority, the computer program product comprising a non-transitory computer readable storage medium having program instructions embodied therewith, the program instructions executable by a computer to cause the computer to:
receive at a first mobile device a master digital copy of the registration, the registration being proof that the specified physical object has been registered with a registration authority; and
transmit at a first mobile device a valid peripheral digital copy of the registration showing that the specified physical object has been registered with the registration authority, the valid peripheral digital copy of the registration having been made by the first mobile device from the master digital copy of the registration and sent from the first mobile device to the second mobile device and including a security feature preventing the valid peripheral digital copy of the registration from being used to make other valid digital copies of the registration that would show registration of the specified physical object with the registration authority to limit copying of the registration.

18. The computer program product of claim 17, the program instructions executable by the computer to further cause the computer to:
transmit the master digital copy of the registration to an electronic device, whereby the electronic device is capable of being used to determine that the master digital copy of the registration is valid.

19. The computer program product of claim 18, wherein the computer comprises the first mobile device, and wherein the receiving the master digital copy of the registration, the transmitting the valid peripheral digital copy of the registration, and the transmitting the master digital copy of the registration are all performed by the first mobile device.

20. The computer program product of claim 18, wherein the receiving the master digital copy of the registration is by the first mobile device, wherein the transmitting the valid peripheral digital copy of the registration is from the first mobile device to the second mobile device and occurs during a first face to face encounter between a user of the first mobile device and a user of the second mobile device, and wherein the transmitting the master digital copy of the registration to the electronic device is from the first mobile device and occurs during a second face to face encounter between the user of the first mobile device and a user of the electronic device.

\* \* \* \* \*